(12) United States Patent
Pancutt

(10) Patent No.: US 11,858,367 B2
(45) Date of Patent: Jan. 2, 2024

(54) LOADING DOCK-INTEGRATED ELECTRIC VEHICLE CHARGING SYSTEM AND METHOD

(71) Applicant: Carl James Mark Pancutt, San Pedro, CA (US)

(72) Inventor: Carl James Mark Pancutt, San Pedro, CA (US)

( * ) Notice: Subject to any disclaimer, the term of this patent is extended or adjusted under 35 U.S.C. 154(b) by 227 days.

(21) Appl. No.: 17/527,933

(22) Filed: Nov. 16, 2021

(65) Prior Publication Data
US 2022/0153152 A1 May 19, 2022

Related U.S. Application Data

(60) Provisional application No. 63/115,984, filed on Nov. 19, 2020.

(51) Int. Cl.
*B60L 53/30* (2019.01)
*H01R 13/639* (2006.01)
*B60L 53/16* (2019.01)

(52) U.S. Cl.
CPC ............ *B60L 53/30* (2019.02); *B60L 53/16* (2019.02); *H01R 13/6397* (2013.01); *B60L 2270/32* (2013.01)

(58) Field of Classification Search
CPC ...... B60L 53/30; B60L 53/16; B60L 2270/32; H01R 13/6397
USPC ........................................................ 320/109
See application file for complete search history.

(56) References Cited

U.S. PATENT DOCUMENTS

| | | | | |
|---|---|---|---|---|
| 10,717,614 | B1* | 7/2020 | Hirschi | G09F 17/00 |
| 2008/0042865 | A1* | 2/2008 | Shephard | B65G 69/006 340/932.2 |
| 2008/0127435 | A1* | 6/2008 | Maly | B65G 69/2882 14/71.1 |
| 2009/0255158 | A1* | 10/2009 | Vait | G09F 17/00 40/606.01 |
| 2010/0146719 | A1* | 6/2010 | Swessel | B65G 69/2882 14/71.3 |
| 2010/0283580 | A1* | 11/2010 | Sheng | G09F 3/0335 340/5.31 |
| 2011/0209411 | A1* | 9/2011 | Thompson | E05D 13/003 49/506 |

(Continued)

FOREIGN PATENT DOCUMENTS

| | | | | |
|---|---|---|---|---|
| CN | 109466518 A | * | 3/2019 | ............. B60L 53/16 |
| CN | 113232575 A | * | 8/2021 | |

(Continued)

*Primary Examiner* — Suresh Memula
(74) *Attorney, Agent, or Firm* — Myers Andras Ashman Bisol LLP; Joseph C. Andras

(57) ABSTRACT

A loading dock safety system integrated with an electric vehicle charging station is disclosed. The system employs an electric vehicle charging station for charging electric vehicles and a safety control device for monitoring and controlling the loading dock safety equipment. The electric vehicle charging station has a charging connector with an electronically controlled latching mechanism to secure the charging connector to the charging port of the electric vehicle. During the process of loading and unloading cargo from the electric vehicle, the charging connector is locked to the charging port, which, in turn, prevents the EV from departing from the loading dock until the transfer of cargo is complete.

20 Claims, 8 Drawing Sheets

(56) References Cited

U.S. PATENT DOCUMENTS

| | | | |
|---|---|---|---|
| 2017/0341883 A1* | 11/2017 | Boston | B65G 69/003 |
| 2018/0096603 A1* | 4/2018 | Mushynski | B65G 69/2882 |
| 2019/0080537 A1* | 3/2019 | Pryor | B60R 25/10 |
| 2020/0024090 A1* | 1/2020 | Mushynski | B65G 69/2882 |
| 2020/0273133 A1* | 8/2020 | Morris | G06Q 10/06315 |
| 2022/0144564 A1* | 5/2022 | Hoofard | B65G 69/24 |
| 2023/0127254 A1* | 4/2023 | Slaney-Smith | G07C 9/29 49/31 |
| 2023/0145675 A1* | 5/2023 | Johannes | B60R 16/033 280/420 |
| 2023/0151568 A1* | 5/2023 | Satrom | E06B 9/02 49/386 |

FOREIGN PATENT DOCUMENTS

| | | | | |
|---|---|---|---|---|
| CN | 115416538 A | * | 12/2022 | |
| DE | 202011050007 U1 | * | 8/2011 | B65G 69/2882 |
| DE | 102015002460 A1 | * | 8/2016 | B65G 69/003 |
| EP | 2460743 A1 | * | 6/2012 | B65G 1/0485 |
| ES | 1019882 U | * | 5/1992 | |
| WO | WO-2019018679 A1 | * | 1/2019 | B60K 1/04 |

* cited by examiner

LOADING DOCK-INTEGRATED ELECTRIC VEHICLE CHARGING SYSTEM AND METHOD

RELATED APPLICATION INFORMATION

The present application claims priority under 35 U.S.C. Section 119(e) to U.S. Provisional Patent Application Ser. No. 63/115,984 filed Nov. 19, 2020 entitled "Loading Dock-Integrated Electric Vehicle Charging System and Method" the disclosure of which is incorporated herein by reference in its entirety.

BACKGROUND OF THE INVENTION

1. Field of the Invention

The present invention relates in general to loading dock safety systems. More particularly, the invention is directed to loading dock safety systems employing an electric vehicle charging station configured to prevent an electric-powered vehicle from departing before the transfer of cargo has been completed.

2. Description of the Related Art

Warehouse safety is an on-going concern with operations around the loading dock causing many injuries and fatalities each year. A common loading dock accident occurs when a trailer departs unexpectedly during the loading process causing a forklift or loading dock personnel to fall off the loading dock. As the world continues to transition to electric-powered vehicles, the issue of preventing loading dock accidents involving electric powered vehicles must be addressed.

Accordingly, a need exists to provide a safety system for loading docks servicing electric powered vehicles.

SUMMARY OF THE INVENTION

In the first aspect, a safety system for facilitating the safe transfer of cargo to or from an electric vehicle is disclosed. The safety system comprising an electric vehicle ("EV") charging system and a safety control device. The EV charging system comprises an EV charging station comprising a controller and a power supply for providing charging current to an EV, and a charging connector connected to the EV charging station having a lockable latching mechanism to releasably secure the charging connector to a charging port of the EV, the lockable latching mechanism controlled by the EV charging station controller. The safety control device is configured to interface with loading dock safety equipment, the safety control device communicatively coupled to the EV charging station.

In a first preferred embodiment, the controller is further configured to transition the system between an EV Functional State to an EV Locked Out State. When the system is in the EV Functional State, the lockable latching mechanism is unlocked to allow the release of the charging cable from the charging port of the EV and the safety control device enables the loading dock safety equipment to prevent the transfer of cargo off or onto the EV.

When the system is in the EV Locked Out State, the lockable latching mechanism is locked to prevent the release of the charging cable from the charging port of the EV and the safety control device disables the loading dock safety equipment to allow the transfer of cargo off or onto the EV.

The EV Locked Out State is preferably activated upon the connecting of the charging connector to the charging port of the EV. The EV Functional State is preferably activated upon the enabling of the safety equipment to prevent the transfer of cargo to or from the EV.

The safety control device preferably comprises an input for setting the safety status of the loading dock, one or more outputs for controlling the loading dock safety equipment, and a communication port for communicating with the EV charging station. The safety system preferably monitors a status of the EV charging station and the safety control device. The lockable latching mechanism preferably comprises an electronic lock controlled by the controller. The safety control device preferably comprises a motorized loading dock door. The safety control device preferably comprises a manually operated access lock.

In a second aspect, an electric vehicle ("EV") charging system for facilitating the safe transfer of cargo from an electric vehicle is disclosed. The EV charging system comprises an EV charging station comprising a controller, a power supply for providing charging current to an EV, and a charging connector connected to the EV charging station having a lockable latching mechanism to releasably secure the charging connector to a charging port of an EV, the lockable latching mechanism controlled by the EV charging station controller. The controller is communicatively coupled to a safety control device, the safety control device configured to interface with loading dock safety equipment.

In a second preferred embodiment, the controller is further configured to transition the system between an EV Functional State to an EV Locked Out State. When the system is in the EV Functional State, the lockable latching mechanism is unlocked to allow the release of the charging cable from the charging port of the EV and the safety control device enables the loading dock safety equipment to prevent the transfer of cargo off or onto the EV. When the system is placed in the EV Locked Out State, the lockable latching mechanism is locked to prevent the release of the charging cable from the charging port of the EV and the safety control device disables the loading dock safety equipment to allow the transfer of cargo onto the EV.

The EV Locked Out State is preferably activated upon the connecting of the charging connector to the charging port of the EV. The EV Functional State is preferably activated upon the enabling of the safety equipment to prevent the transfer of cargo to the EV.

The safety system preferably monitors a status of the EV charging station and the safety control device. The lockable latching mechanism preferably comprises an electronic lock controlled by the controller. The safety control device preferably comprises a motorized loading dock door. The safety control device preferably comprises a manually operated access lock.

In a third aspect, a method for facilitating the safe transfer of cargo to or from an electric vehicle is disclosed. The method comprises employing one or more controllers for detecting an electric vehicle ("EV") charging connector connected to a charging port of an EV, transmitting a first signal to a safety control device indicating that the EV charging connector is connected to a charging port of an EV, and determining that a loading dock is currently configured to allow the safe transfer of cargo to the EV. The method further comprises transmitting a second signal to an EV charging station indicating that the loading dock is currently configured to allow the safe transfer of cargo to the EV, and locking a lockable latching mechanism of an EV charging connector to releasably secure the EV charging connector to an EV charging port.

In a third preferred embodiment, the method further comprises transmitting a third signal to the EV charging station indicating that safe loading and unloading of cargo has been completed, determining that charging of the EV is completed, and unlocking the lockable latching mechanism of the EV charging connector to unlock the EV charging connector from the EV charging port.

The method preferably further comprises monitoring the safety control device and the EV charging station to determine metrics including at least one of the following: metrics on charger power, charger current, energy dispensed, EV charging time (power start and stop), time loading dock doors (or barriers) are open (time closed to time next closed), and time loading dock doors (or barriers) are closed (time closed to time next opened).

These and other features and advantages of the invention will become more apparent with a description of preferred embodiments in reference to the associated drawings.

DETAILED DESCRIPTION OF THE PREFERRED EMBODIMENTS

Figure 1:
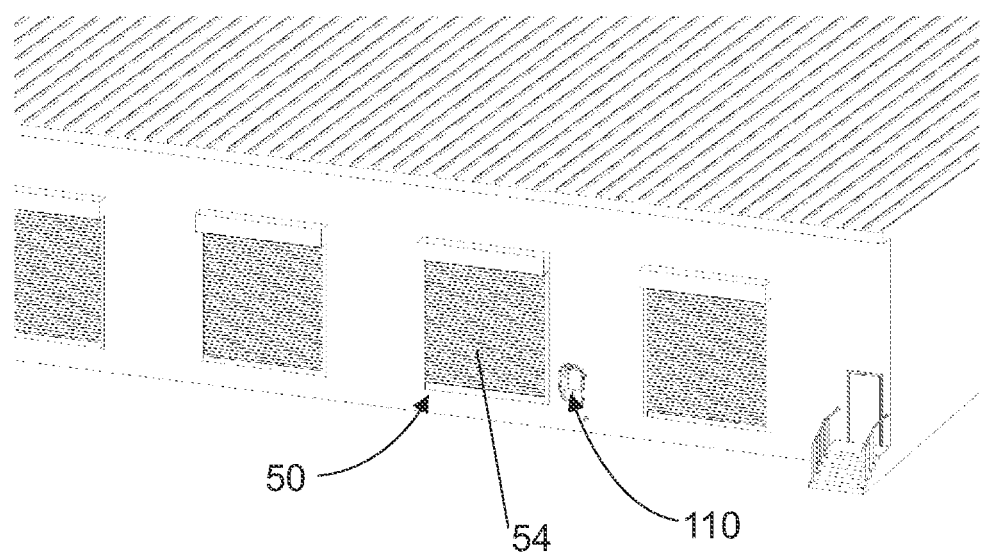
FIG. 1 is a perspective view of a loading dock having an electric vehicle charging system.

The work of moving cargo at loading docks is essential for the operation of businesses world-wide. Unfortunately, loading docks are often inherently dangerous workplaces as loading dock accidents may account for roughly twenty-five percent of all industrial accidents.

One of the most dangerous loading dock accidents occur because of "forklift fall-through," where a forklift or loading dock personnel accidentally falls off of the loading dock. This may occur when a truck driver erroneously believes that the cargo transfer has been completed and departs from the loading dock prematurely without properly notifying the loading dock personnel.

In an embodiment, a loading dock safety system addresses the problem of an electric-powered vehicle departing a loading dock before the safe completion of cargo transfer. Electric vehicles ("EV") often have internal interlock systems which prevent the EVs from motion while the electrical charging cords are attached to the vehicle. Hence, an EV is effectively disabled and prevented from departing while a charging connector is connected to the charging port of the EV. In one or more embodiments, a safety system which relies on the EV interlock system to disable an EV is contemplated. In an embodiment, a charging connector having an electrically-controlled locking feature is locked to an EV which prevents the EV from departing from a loading dock.

In one or more embodiments, a loading dock safety system to prevent the unintentional departure of an electric-powered truck comprises an EV charging system for charging an EV and a safety control device which controls and monitors the loading dock safety equipment. The EV charging system has a charging connector with a lockable latching mechanism which, when enabled, prevents a user from removing the charging connector from the EV charging port. The safety control device monitors and controls the loading dock safety equipment, and works with the EV charging system to prevent the EV from departing from the loading dock before the cargo transfer is complete and the loading dock personnel are notified.

The safety control device monitors and controls the loading dock safety equipment. One example of loading dock safety equipment may include a loading dock door which, when employing proper workplace procedures, is closed when there is no trailer in the loading bay and is opened only when a trailer is present and is able to be accessed safely with a forklift or loading dock personnel. An opened loading dock door indicates to loading dock personnel that a trailer is properly secured, which alerts a forklift operator to safely transfer cargo from the trailer. Other types of loading dock equipment include beacons and annunciators to alert loading dock personnel, door sensors and door locks to monitor and control the operation of the loading dock door, powered doors, and other barrier systems which may block a forklift driver from entering a hazardous area.

As used herein and as is commonly known in the art, the term "electric vehicle" refers to vehicles which rely on batteries to provide transportive power and may refer to vehicles which exclusively rely on batteries as well as hybrid cars which rely on both electric motors as well as internal combustion engines. The term "vehicle" is used to describe a machine that transports people or cargo, and may refer to trucks, automobiles, vans, buses, motorcycles, and railed vehicles for example. Embodiments described herein refer to loading docks as an illustration of structures or locations which require vehicles to remain stationary and secured; however, other structures which would benefit from the disclosure described herein are contemplated in one or more embodiments.

A loading dock-integrated electric vehicle charging system and method is disclosed. The solution to integrates loading dock safety with EV charging to provide a full solution to both charge electric trucks and to enable safe loading/unloading operations.

In light of the aforementioned problems associated with the prior devices and methods, it is an object of the present invention to provide a Loading Dock-Integrated Electric Vehicle Charging System and Method. Solution should integrate loading dock safety with EV charging to provide a full solution to both charge electric trucks and to enable safe loading/unloading operations.

This invention relates generally to electric vehicle charging systems and, more specifically, to a loading dock-Integrated Electric Vehicle Charging System and Method.

Warehouse safety is an on-going concern with operations around the loading dock causing many injuries and fatalities each year. Integrating EV chargers for electric powered trucks at the loading dock is expected to become the norm in the very near future.

The following description is provided to enable any person skilled in the art to make and use the invention and sets forth the best modes contemplated by the inventor of carrying out bis invention. Various modifications, however, will remain readily apparent to those skilled in the art, since the generic principles of the present invention have been defined herein specifically to provide a Loading Dock-Integrated Electric Vehicle Charging System and Method.

Direct Current Fast Chargers (DCFC) for electric vehicles are locked in the charging port for safety while charging, upon charge completion or command to stop charging the charging connector is released. Additionally, while a vehicle is charging, the vehicle prevents the vehicle from being driven.

A new EV charger that integrates EV charging with loading dock safety. The EV Dock Charger interlocks connector locking mechanism with dock door controls (for powered dock doors) or a physical electro-mechanical lock (for manual doors or barriers).

During charging operations, standard DCFC EV charger connectors are locked in the vehicle charge port to ensure safe charging, preventing removal while electricity is supplied to the vehicle. The EV Dock Charger takes things further by integrating the connector locking function with the loading dock door or barrier. Once the EV Dock Charger connector is plugged in, it can begin charging the vehicle, but it also sends a signal to the loading dock door or barrier enabling the door operation or unlocking the electromechanical door lock.

Once the door or barrier is opened, the charger receives a signal to keep the charger connector locked in the vehicle, regardless of charging activity. This ensures the vehicle cannot drive away while dock workers are loading/unloading the vehicle, since the charger is still plugged in and electric vehicles are prohibited from moving while plugging in.

Only once the door or barrier is closed, is a signal sent to the charger to allow the connector to be released, if other safe charging conditions are also met. Once both the charging has stopped AND the dock door/barrier is closed, may the charger connector be IO unlocked and removed from the vehicle. Upon release, the dock door/barrier is then locked in the closed position.

In addition to the above operation of the EV Dock Charger, the system will also monitor and provide metrics on charger power, energy dispensed, time each vehicle is charging, time vehicle is connected but not charging, time loading dock doors are open, time doors are closed but charger remains connected etc. . . . . These metrics may be used to determine dock operation statistics to be used to improve operational efficiencies and calculate power usage and costs.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

Figure 2:
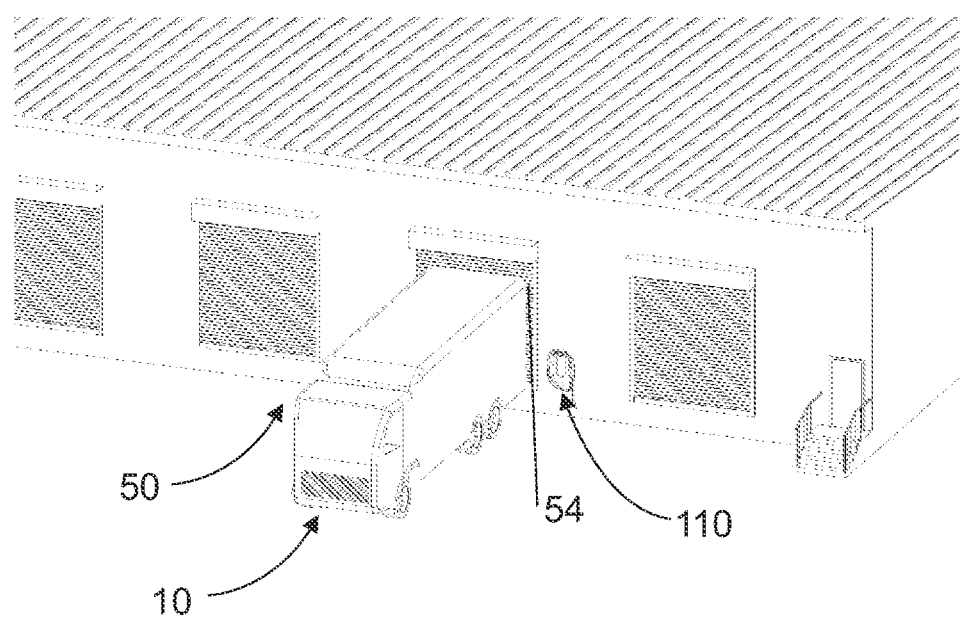
FIG. 2 is a perspective view of an electric vehicle backed against the loading dock.
Figure 3:
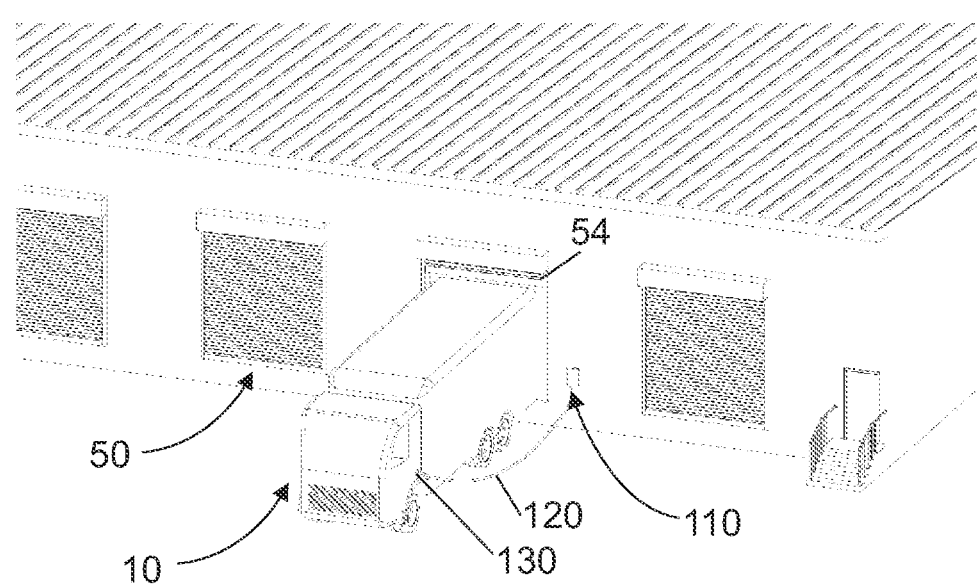
FIG. 3 is a perspective view of the electric vehicle backed against the loading dock where the loading dock doors are opened to facilitate the loading and unloading of cargo from the electric vehicle.

FIGS. 1-3 depict the use of a loading dock safety system 100 comprising an electric vehicle charging system 110 and a safety control device 151 in one or more embodiments. FIG. 1 is a perspective view of a loading dock 50 having an electric vehicle charging system 110. In an embodiment, the loading dock door 54 is kept closed when there is no truck in the loading bay to service in conformance with common safety protocols. The EV charging system 110 is shown positioned adjacent near the loading dock door 54.

FIG. 2 is a perspective view of an EV 10 backed against the loading dock 50. The EV charging system 54 remains detached from the EV 10. As the EV 10 has not yet been secured, (i.e., the charging connector has not yet been locked to the charging port of the EV) the loading dock doors 54 remain closed.

FIG. 3 is a perspective view of the electric vehicle 10 backed against the loading dock 50 where the loading dock doors 54 are opened to facilitate the loading and unloading of cargo from the EV 10 after the EV 10 is secured. The EV charging system 101 is connected and locked to the EV 10 with the charging connector 130 coupled via the charging cable 120. Once the charging connector 130 is locked to the EV 10, the EV 10 cannot be started which secures the EV 10 in place while the cargo is being transferred. As the EV 10 is secured and rendered stationary, the cargo can be safely loaded and unloaded from the EV 10.

Figure 4:
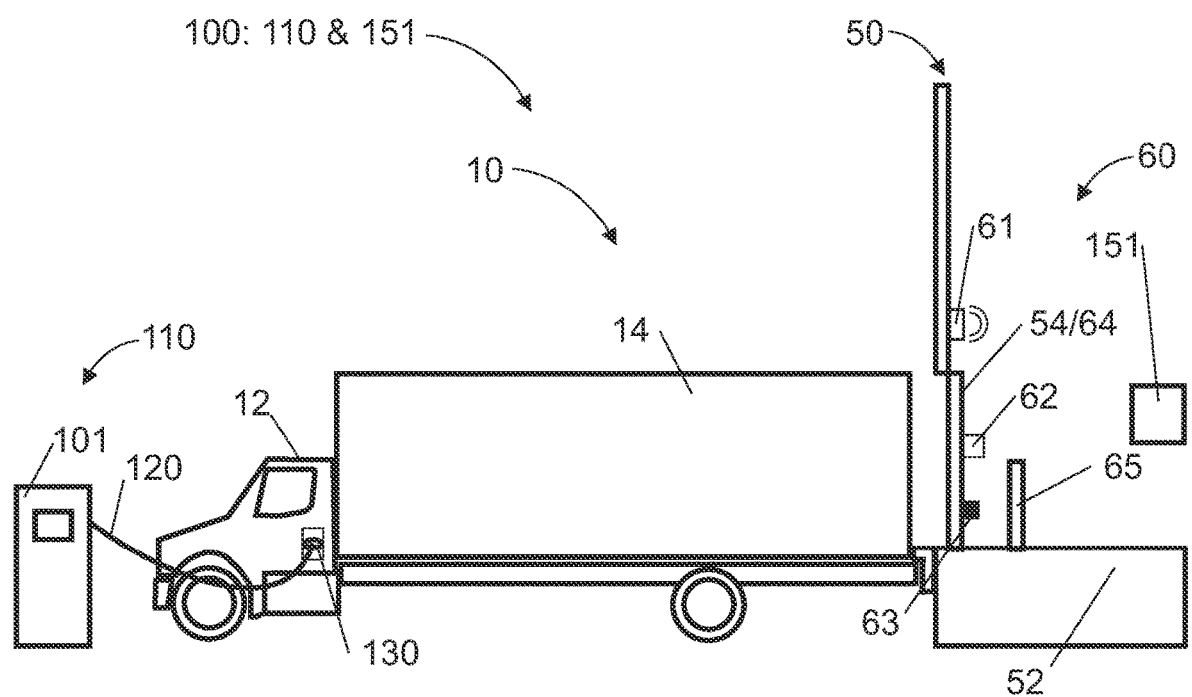
FIG. 4 is a side, schematic view of an electric vehicle charging system, an electric vehicle, and a loading dock having safety equipment.

FIG. 4 is a side, schematic view of an EV charging system 110, an EV 10, and a loading dock 50 having safety equipment 60. In an embodiment, the EV 10 comprises an EV tractor unit 12 which pulls a semi-trailer 14. The EV charging system 110 comprises an EV charging station 101, a charging cable 120, and a charging connector 130 which mates with the charging port of the EV 10. The loading dock 50 has a loading dock floor 52, a loading dock door 54, as well as loading dock safety equipment 60. The loading dock safety equipment 60 may include annunciators and beacons 61, one or more loading dock door sensors 62, one or more loading dock door latches 63, a motorized-power loading dock power door 64, as well as other barriers 65 which are used to block access or notify loading dock personnel of potential hazards. A safety control device 151 is configured to control and monitor the loading dock safety equipment 60.

Figure 5:
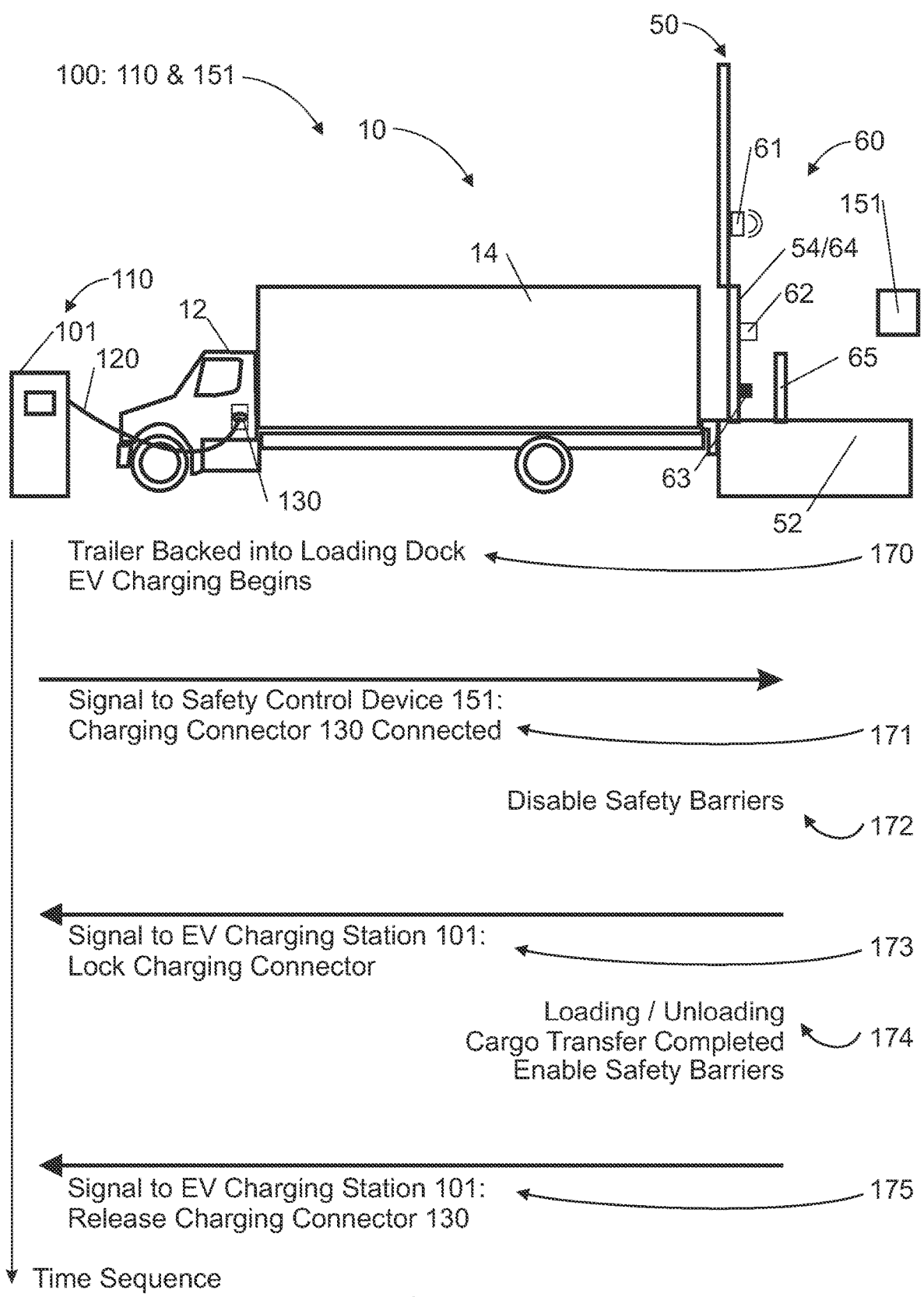
FIG. 5 is a side, schematic view of the electric vehicle charging system, an electric vehicle, and a loading dock, along with a representation of the communication between the charging system and the safety control device in an embodiment.

FIG. 5 is a side, schematic view of the EV charging system 110, an electric vehicle 10, and a loading dock 50, along with representation of the communication between the EV charging system 110 and the safety control device 151 in an embodiment. FIG. 5 also depicts a timeline showing the sequence of events including transmission of signals between the EV charging station 101 and the safety control device 151.

In one or more embodiments, safety protocols and systems are in place in the loading dock 50 to block passageway to unsafe regions of the loading dock 50 and to alert loading dock personnel. The process begins with an EV 10 backing a semi-trailer 14 into a loading dock 50. The driver of the EV 10, for example, will place the charging connector 130 into the charging port of the EV 10 (step 170).

The EV charging station 101 will transmit a first signal to the safety control device 151 indicating that the EV charging connector 130 is connected to a charging port of an EV 10 in an embodiment (step 171).

The safety control device 151 receives the first signal, checks the status of the loading dock safety equipment 60 to make sure the conditions are safe, and disables the safety equipment 60 (step 172). This step of disabling the safety equipment 60 may include allowing the loading dock door 54 to open, energizing a power loading dock door 64 to open, releasing a door latch 63 to allow the loading dock door to open, monitoring the opening of the loading dock door 54/65 with a loading dock door sensor 62, opening other barriers 65 which block entry, and sounding alerts on beacons or annunciators 61 for example.

The safety control device 151 may then transmit a second signal to an EV charging station 101 indicating that the loading dock 50 is currently configured to allow the safe transfer of cargo to the EV 10, and to instruct the charging connector 130 to lock to the charging port of the EV 10 (step 173).

Having the EV 10 secured and locked-in-place and the loading dock safety equipment disabled, the trailer 14 may now be safely accessed by personnel on the loading dock 50 who can then safely unload or load cargo onto the trailer 14.

Once the cargo transfer is completed and the forklift and other personnel are safely removed from the trailer 14, the safety equipment 60 can now be enabled (step 174).

This step of enabling the safety equipment 60 may include closing the loading dock door 54, energizing a power loading dock door 64 to close, releasing a door latch 63 to allow the loading dock door to close, monitoring the closing of the loading dock door 54/65 with a loading dock door sensor 62, closing other barriers 65 which block entry, and sounding alerts on beacons or annunciators 61 for example.

The safety control device 151 will then transmit a third signal to the EV charging station 101 indicating that safe loading and unloading of cargo has been completed. The EV charging station 101 will then determine whether the charging of the EV 10 has been completed. If the charging of the EV has been completed, the EV charging station will unlock the lockable latching mechanism of the EV charging connector 130 to unlock the EV charging connector 130 from the EV charging port.

In one or more embodiments, the EV charging system 110 is configured to provide a manual override when transferring cargo from a gasoline or diesel powered vehicle. In an embodiment, the EV charging station provides and override in the form of a manually operated button, through a touch screen, or via a remote server providing commands to the controller 104.

In one or more embodiments, physical inputs and outputs to a typical electric vehicle charging station is contemplated, with applied software logic to only allow the unlocking of the EV charger connector once an input signal is received, in this case the input signal being the detection that a loading dock door 54 has been closed.

Figure 6:
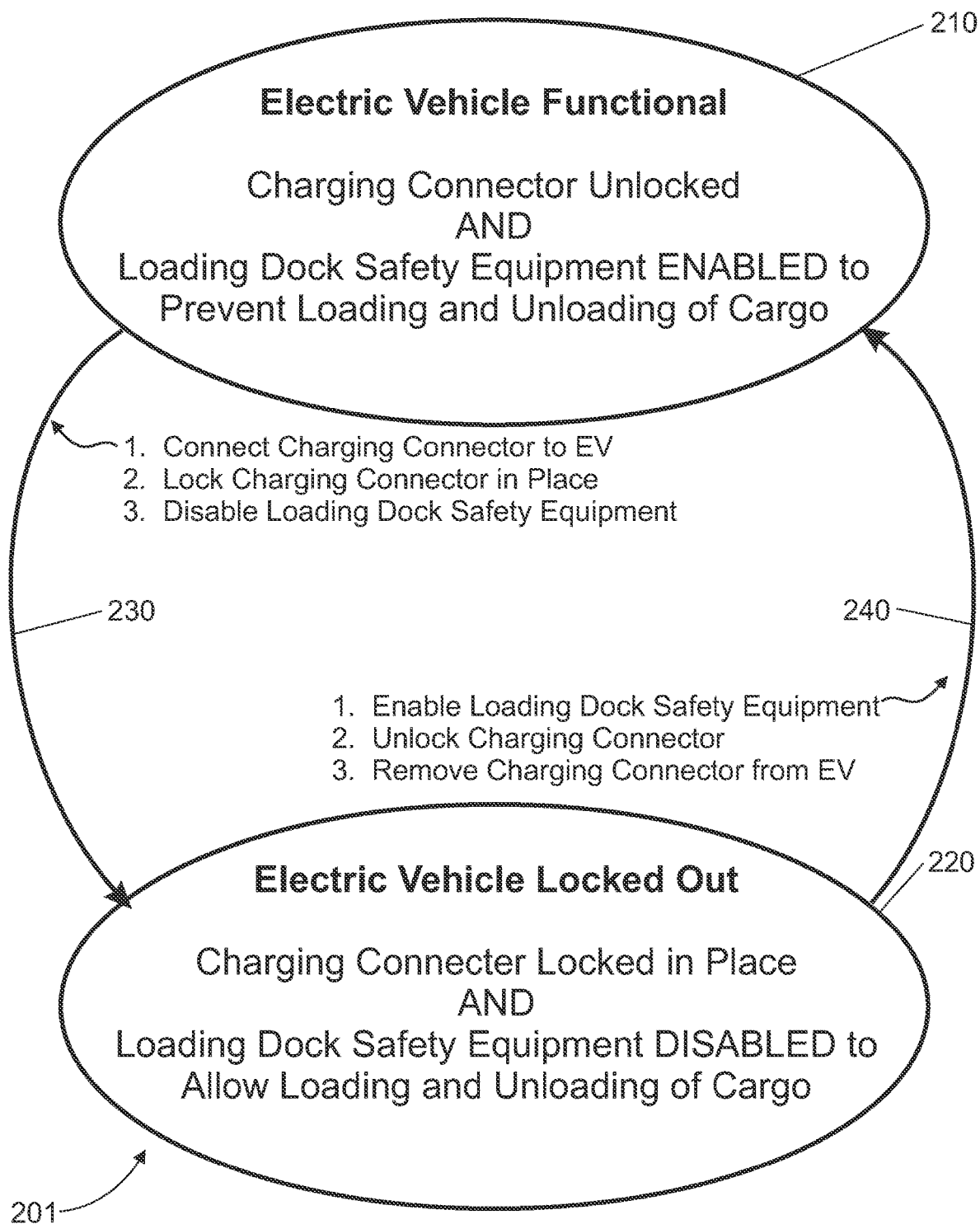
FIG. 6 is a state diagram illustrating that the system functions in an Electric Vehicle Functional State and an Electric Vehicle Locked Out State in an embodiment.

The behavior of the system 100 comprising an EV charging system 110 and the safety control device 151 controlling the safety equipment 60 may also be interpreted as a state diagram to show that the overall system is composed of a finite number of states in an embodiment. FIG. 6 is a state diagram 201 illustrating the system functions in an Electric Vehicle Functional State 210 and an Electric Vehicle Locked Out State 220 in an embodiment. The system 100 may transition between States 210 and 220 via transitions 230 and 240.

In the Electric Vehicle Functional State 210, the charging connector 130 is unlocked and the loading dock safety equipment 60 is enabled to prevent the loading and unloading of cargo from the EV 10.

In the Electric Vehicle Locked Out State 220, the charging connector 130 is locked in place and locked to the charging port of the EV 10, and the loading dock safety equipment 60 is disabled to allow the safe loading and unloading of cargo from the EV 10.

The system 100 can transition from the Electric Vehicle Functional State 210 to the Electric Vehicle Locked Out State 220 via transition 230. Transition 230 comprises the steps of (1) a user connecting the charging connector 130 to the EV 10, (2) the system 100 locking the charging connector 130 in place which cannot be removed manually by the user, and (3) disabling the loading dock safety equipment 60 to allow the safe transfer of cargo onto the EV 10.

The system 100 can transition from the Electric Vehicle Locked Out State 220 to the Electric Vehicle Functional State 210 via transition 240. Transition 240 comprises the steps of (1) the system 100 enabling the loading dock safety equipment 60 to prevent the transfer of cargo, (2) the system unlocking the charging connector 130 from the EV 10, and (3) the user removing the charging connector from the (2) the system 100 locking the charging connector 130 in place which cannot be removed manually by the user, and (3) disabling the loading dock safety equipment 60 to allow the safe transfer of cargo onto the EV 10.

Figure 7:
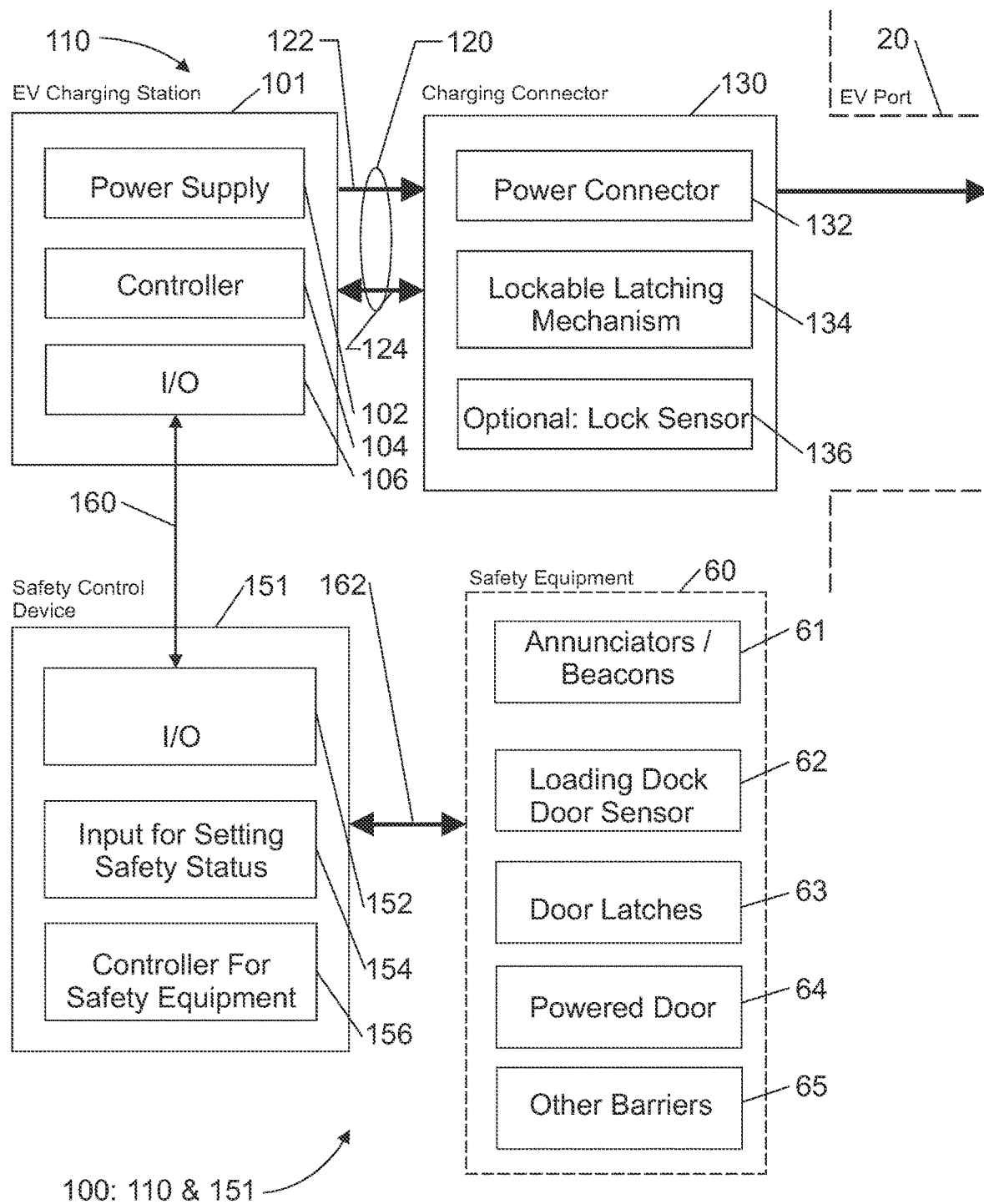
FIG. 7 is a block diagram of loading dock safety system having an electric vehicle charging station, a charging connector, and a safety control device controlling the loading dock safety equipment in a preferred embodiment.

FIG. 7 is a block diagram of the loading dock safety system 100 comprising the EV charging system 110 and the safety control device 151 which controls the safety equipment 60. The EV charging system 110 comprises an EV charging station 101, a charging cable 120, and a charging connector 130 which mates with the charging port 20 of the EV 10.

The EV charging station 101 comprises a controller 104, a power supply 102 for providing charging current to an EV 10, and an Input/Output ("I/O") 106 for communicatively coupling with the safety control device 151. The controller 104 may comprise a micro-controller, micro-processor, programmable logic controller, or a logic circuit for example.

The EV charging station 101 and the safety control device 151 are communicatively coupling through link 160. In one or more embodiments, the link 160 may be hardwired, wireless, or a combination of both in one or more embodiments.

The charging connector 130 comprises a power connector 132, a lockable latching mechanism 134, and an optional lock sensor 136. The charging connector 130 is configured to engage with and provide charging current to the EV charging port 20. In an embodiment, the lockable latching mechanism 134 is electronically controlled by the controller 104 which cannot be easily overridden manually by a user. The lockable latching mechanism may be mechanical, electro-mechanical, or magnetic device for example.

Charging cable 120 couples the charging connector 130 to the charging station 101. In an embodiment, the charging cable 120 comprises a power cable 120 for providing charging current to the charging connector as well as one or more signal cables which provide connects the lockable latching mechanism 134 and the lock sensor 136 to the controller 104.

The safety control device 151 comprises an Input/Output ("I/O") circuit 152 for communicatively coupling with the EV charging station 101, an input for setting the safety status 152 of the loading dock, and a controller for controlling and monitoring the safety equipment 60 in the loading dock 50. The safety control device and the safety equipment are coupled via link 162, which may be a hard-wired connection, a wireless connection, or a combination of both.

The safety equipment 60 may comprise annunciators and beacons 61, loading dock door sensors, loading dock door latches 63, a motorized power door 64, barriers 65, as well as other loading dock safety equipment designed to prevent accidents in a loading dock 50. In an embodiment, the safety control device comprises a manually operated access lock.

In summary, the safety system 100 for facilitating the safe transfer of cargo to or from an electric vehicle comprises an EV charging system 110 and a safety control device 151 in one or more embodiments. The EV charging system 110 comprises an EV charging station 101 having a controller 104 and a power supply 102 for providing charging current to an EV 10. The charging connector 130 is connected to the EV charging station 101. The charging connector 130 has a lockable latching mechanism 134 to releasably secure the charging connector 130 to a charging port 20 of the EV 10. The lockable latching mechanism 134 is controlled by the EV charging station controller 104. The safety control device 151 is configured to interface with loading dock safety equipment 60. The safety control device 151 is communicatively coupled to the EV charging station 101.

Referring to FIGS. 6 and 7, the controller 104 is further configured to transition the system 100 between an EV Functional State 210 to an EV Locked Out State 220. When the system 100 is placed in the EV Functional State 210, the lockable latching mechanism 134 is unlocked to allow the release of the charging cable 130 from the charging port 20 of the EV 10 and the safety control device 151 enables the loading dock safety equipment 60 to prevent the transfer of cargo onto the EV 10. When the system 100 is placed in the EV Locked Out State 220, the lockable latching mechanism 134 is locked to prevent the release of the charging cable 130 from the charging port 20 of the EV and the safety control device 151 disables the loading dock safety equipment 60 to allow the transfer of cargo off or onto the EV 10.

The EV Locked Out State 220 is activated upon the connecting of the charging connector 130 to the charging port 20 of the EV 10. The EV Functional State 210 is activated upon the enabling of the safety equipment 60 to prevent the transfer of cargo to or from the EV 10.

In an embodiment, the safety system 100 monitors a status of the EV charging station 101 and the safety control device 151. The system 100 is further configured to continuously monitor the safety control device 151 and the EV charging station 101 to determine and log performance metrics including at least one of the following: metrics on charger power, energy dispensed, EV charging time, the time loading dock doors are open, and the time loading dock doors are closed.

Figure 8:
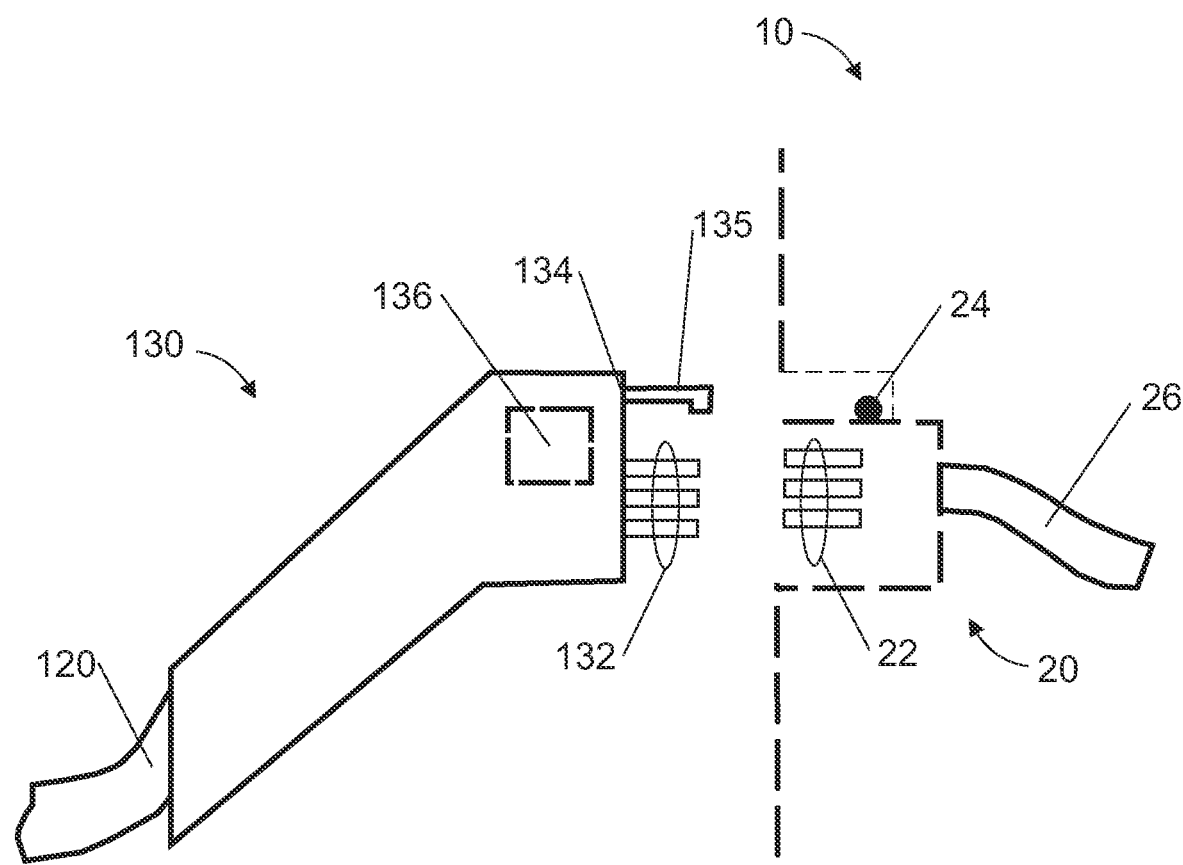
FIG. 8 is a side, schematic view of a charging connector and an electric vehicle charging port in an embodiment.

FIG. 8 is a side, schematic view of a charging connector 130 and an electric vehicle charging port 120 in an embodiment. The EV charging port 20 for an EV 10 is shown schematically as having one or more connection terminals 22 which mates with the EV power connectors 132, and provides current to the batteries of the EV 10 through the EV power cable 26.

The charging connector 130 comprises one or more power connectors 132, a lockable latching mechanism 134, and an optional lock sensor 136. The charging connector 130 is configured to engage with and provide charging current to the EV charging port 20. In a preferred embodiment, the lockable latching mechanism comprises an electronic lock controlled by the controller.

In an embodiment, the lockable latching mechanism 134 may comprise a hook 135 that engages with the catch 24 of the EV charging port 20. The latching mechanism depicted is for illustration purposes only as other forms of electrical, electro-mechanical, mechanical, and magnetic latches are contemplated in one or more embodiments.

Figure 9:
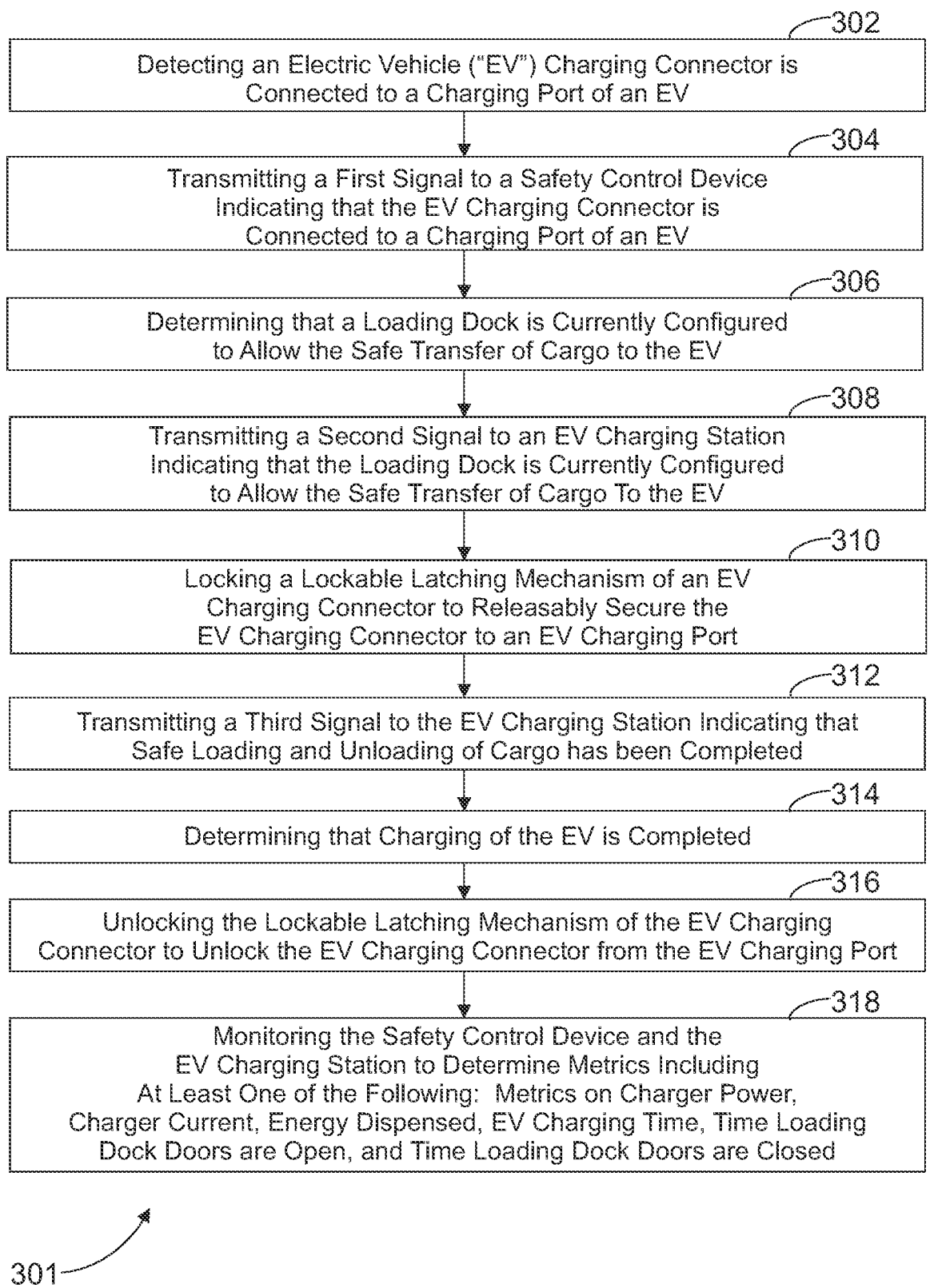
FIG. 9 is a flow chart of an exemplary method for facilitating the safe loading and unloading of cargo from an electric vehicle.

FIG. 9 is a flow chart 301 of an exemplary method for facilitating the safe loading and unloading of cargo from an electric vehicle 10. One or more controllers are configured for detecting an EV charging connector 130 being connected to a charging port 20 of an EV 10 (step 302). The EV charging station transmits a first signal to a safety control device indicating that the EV charging connector 130 is connected to the charging port 20 of the EV 10 (step 304).

Loading dock personnel or the safety equipment 60 determines whether the loading dock is currently configured to allow the safe transfer of cargo to the EV 10 (step 306). The safety control device 151 transmits a second signal to the EV charging station 101 indicating that the loading dock 50 is currently configured to allow the safe transfer of cargo to the EV (step 308).

The EV charging station controller 104 then locks the lockable latching mechanism of the EV charging connector 130 to releasably secure the EV charging connector to an EV charging port 20 (step 310). The safety control device 151 transmits a third signal to the EV charging station 101 Indicating that the transfer of cargo has been completed (step 312).

The EV charging station 101 determines whether the charging of the EV 10 has been completed (step 314). The EV charging station 101 then unlocks the lockable latching mechanism 134 of the EV charging connector to unlock the EV charging connector 130 from the EV charging port 20 (step 316).

The system is further configured to continuously monitors the safety control device 151 and the EV charging station 101 to determine and log performance metrics including at least one of the following: metrics on charger power, charger current, energy dispensed, EV charging time (power start and stop), the time loading dock doors (or barriers) are open, and the time loading dock doors (or barriers) are closed (time closed to time next opened) (step 318).

Although the invention has been discussed with reference to specific embodiments, it is apparent and should be understood that the concept can be otherwise embodied to achieve the advantages discussed. The preferred embodiments above have been described primarily as a safety system for a loading dock having a smart EV charging station and a safety control device for controlling and monitoring loading dock safety equipment. In this regard, the foregoing description of the loading dock safety system is presented for purposes of illustration and description. It shall be apparent that other structures, locations, and types of vehicles and machinery would benefit from the aspects of the loading dock safety system.

Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A safety system for facilitating the safe transfer of cargo to or from an electric vehicle, the safety system comprising:
   an electric vehicle ("EV") charging system comprising:
   an EV charging station comprising a controller and a power supply for providing charging current to an EV;

a charging connector connected to the EV charging station having a lockable latching mechanism to releasably secure the charging connector to a charging port of the EV, the lockable latching mechanism controlled by the EV charging station controller; and, a safety control device configured to interface with loading dock safety equipment, the safety control device communicatively coupled to the EV charging station.

2. The safety system for facilitating the safe transfer of cargo to or from the electric vehicle of claim 1, wherein the controller is further configured to transition the system between an EV Functional State to an EV Locked Out State, wherein in the EV Functional State, the lockable latching mechanism is unlocked to allow the release of the charging cable from the charging port of the EV and the safety control device enables the loading dock safety equipment to prevent the transfer of cargo off or onto the EV, and wherein in the EV Locked Out State, the lockable latching mechanism is locked to prevent the release of the charging cable from the charging port of the EV and the safety control device disables the loading dock safety equipment to allow the transfer of cargo off or onto the EV.

3. The safety system for facilitating the safe transfer of cargo to or from the electric vehicle of claim 2, wherein the EV Locked Out State is activated upon the connecting of the charging connector to the charging port of the EV.

4. The safety system for facilitating the safe transfer of cargo to or from the electric vehicle of claim 2, wherein the EV Functional State is activated upon the enabling of the safety equipment to prevent the transfer of cargo to or from the EV.

5. The safety system for facilitating the safe transfer of cargo to or from the electric vehicle of claim 1, wherein the safety control device comprises:

an input for setting the safety status of the loading dock;
one or more outputs for controlling the loading dock safety equipment; and
a communication port for communicating with the EV charging station.

6. The safety system for facilitating the safe transfer of cargo to or from the electric vehicle of claim 1, wherein the safety system monitors a status of the EV charging station and the safety control device.

7. The safety system for facilitating the safe transfer of cargo to or from the electric vehicle of claim 1, wherein the lockable latching mechanism comprises an electronic lock controlled by the controller.

8. The safety system for facilitating the safe transfer of cargo to or from the electric vehicle of claim 1, wherein the safety control device comprises a motorized loading dock door.

9. The safety system for facilitating the safe transfer of cargo to or from the electric vehicle of claim 1, wherein the safety control device comprises a manually operated access lock.

10. An electric vehicle ("EV") charging system for facilitating the safe transfer of cargo to or from an electric vehicle, the EV charging system comprising:

an EV charging station comprising:
a controller;
a power supply for providing charging current to an EV;
a charging connector connected to the EV charging station having a lockable latching mechanism to releasably secure the charging connector to a charging port of an EV, the lockable latching mechanism controlled by the EV charging station controller, wherein the controller is communicatively coupled to a safety control device, the safety control device configured to interface with loading dock safety equipment.

11. The EV charging system for facilitating the safe transfer of cargo to or from the electric vehicle of claim 10, wherein the controller is further configured to transition the system between an EV Functional State to an EV Locked Out State, wherein in the EV Functional State, the lockable latching mechanism is unlocked to allow the release of the charging cable from the charging port of the EV and the safety control device enables the loading dock safety equipment to prevent the transfer of cargo off or onto the EV, and wherein in the EV Locked Out State, the lockable latching mechanism is locked to prevent the release of the charging cable from the charging port of the EV and the safety control device disables the loading dock safety equipment to allow the transfer of cargo off or onto the EV.

12. The EV charging system for facilitating the safe transfer of cargo to or from the electric vehicle of claim 11, wherein the EV Locked Out State is activated upon the connecting of the charging connector to the charging port of the EV.

13. The EV charging system for facilitating the safe transfer of cargo to or from the electric vehicle of claim 11, wherein the EV Functional State is activated upon the enabling of the safety equipment to prevent the transfer of cargo to or from the EV.

14. The EV charging system for facilitating the safe transfer of cargo to or from the electric vehicle of claim 10, wherein the safety system monitors a status of the EV charging station and the safety control device.

15. The EV charging system for facilitating the safe transfer of cargo to or from the electric vehicle of claim 10, wherein the lockable latching mechanism comprises an electronic lock controlled by the controller.

16. The EV charging system for facilitating the safe transfer of cargo to or from the electric vehicle of claim 10, wherein the safety control device comprises a motorized loading dock door.

17. The EV charging system for facilitating the safe transfer of cargo to or from the electric vehicle of claim 10, wherein the safety control device comprises a manually operated access lock.

18. A method for facilitating the safe transfer of cargo to or from an electric vehicle, the method comprising:

employing one or more controllers for:
detecting an electric vehicle ("EV") charging connector connected to a charging port of an EV;
transmitting a first signal to a safety control device indicating that the EV charging connector is connected to a charging port of an EV;
determining that a loading dock is currently configured to allow the safe transfer of cargo to the EV;
transmitting a second signal to an EV charging station indicating that the loading dock is currently configured to allow the safe transfer of cargo to the EV; and,
locking a lockable latching mechanism of an EV charging connector to releasably secure the EV charging connector to an EV charging port.

19. The method for facilitating the safe transfer of cargo to or from the electric vehicle of claim 18, the method further comprising:
- transmitting a third signal to the EV charging station indicating that safe loading and unloading of cargo has been completed;
- determining that charging of the EV is completed; and
- unlocking the lockable latching mechanism of the EV charging connector to unlock the EV charging connector from the EV charging port.

20. The method for facilitating the safe transfer of cargo to or from the electric vehicle of claim 19, the method further comprising: monitoring the safety control device and the EV charging station to determine metrics including at least one of the following: metrics on charger power, charger current, energy dispensed, EV charging time including power start and stop, time loading dock doors or barriers are open including time closed to time next closed, and time loading dock doors or barriers are closed including time closed to time next opened.

* * * * *